United States Patent [19]
Sholtz

[11] 3,894,256
[45] July 8, 1975

[54] BEARING ASSEMBLY FOR DYNAMOELECTRIC MACHINE

[75] Inventor: Mitchell D. Sholtz, Fort Wayne, Ind.

[73] Assignee: Bowmar Instrument Corporation, Fort Wayne, Ind.

[22] Filed: July 26, 1973

[21] Appl. No.: 382,838

[52] U.S. Cl............................ 310/90; 308/DIG. 5
[51] Int. Cl. ............................................ H02k 5/00
[58] Field of Search .......... 310/90, 63, 44, 57, 156, 310/87, 88, 254, 262, 258–260; 308/DIG. 5, 121, 237

[56] References Cited
UNITED STATES PATENTS

| 2,462,204 | 2/1949 | Ludwig | 310/262 |
|---|---|---|---|
| 2,959,637 | 11/1960 | Weingart | 310/87 |
| 2,993,131 | 7/1961 | Trevitt | 310/90 |
| 3,053,189 | 9/1962 | White | 310/90 |
| 3,138,412 | 6/1964 | Dole | 308/121 |
| 3,218,494 | 11/1965 | Bacon | 310/156 |
| 3,231,768 | 1/1966 | Dannenmann | 310/88 |
| 3,246,187 | 4/1966 | Iemura | 310/156 |
| 3,551,714 | 12/1970 | Boyd | 310/87 |
| 3,663,847 | 5/1972 | Schaefer | 310/90 |
| 3,694,909 | 10/1972 | Hallerback | 310/43 |
| 3,720,914 | 3/1973 | Hallerback | 310/43 |

Primary Examiner—R. Skudy

[57] ABSTRACT

A dynamoelectric machine having the rotor member rotatably supported in the bore of the stator member by bearings pressed-fitted in the stator member bore adjacent the opposite ends thereof.

6 Claims, 2 Drawing Figures

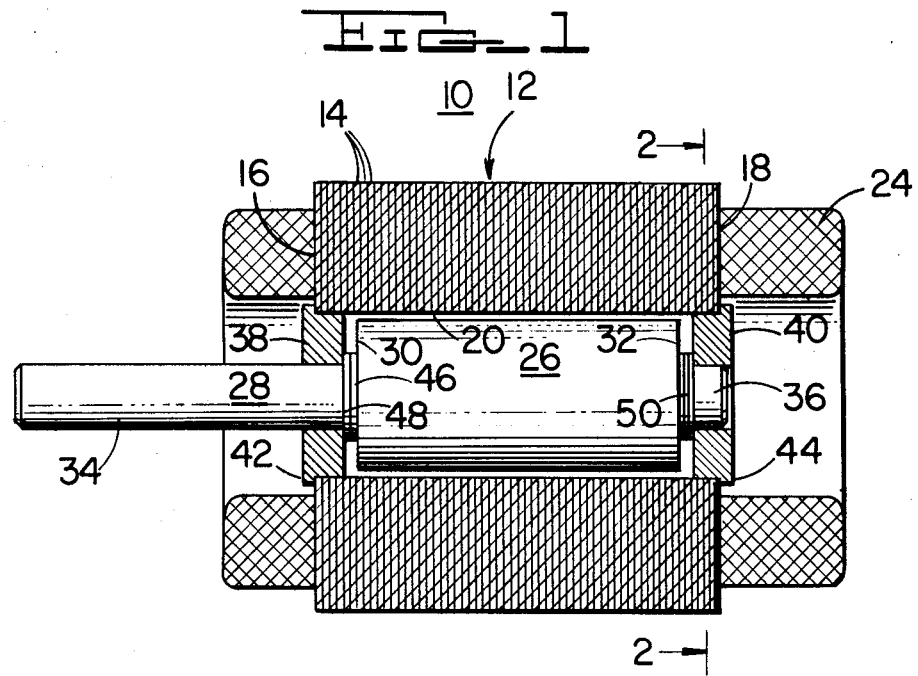
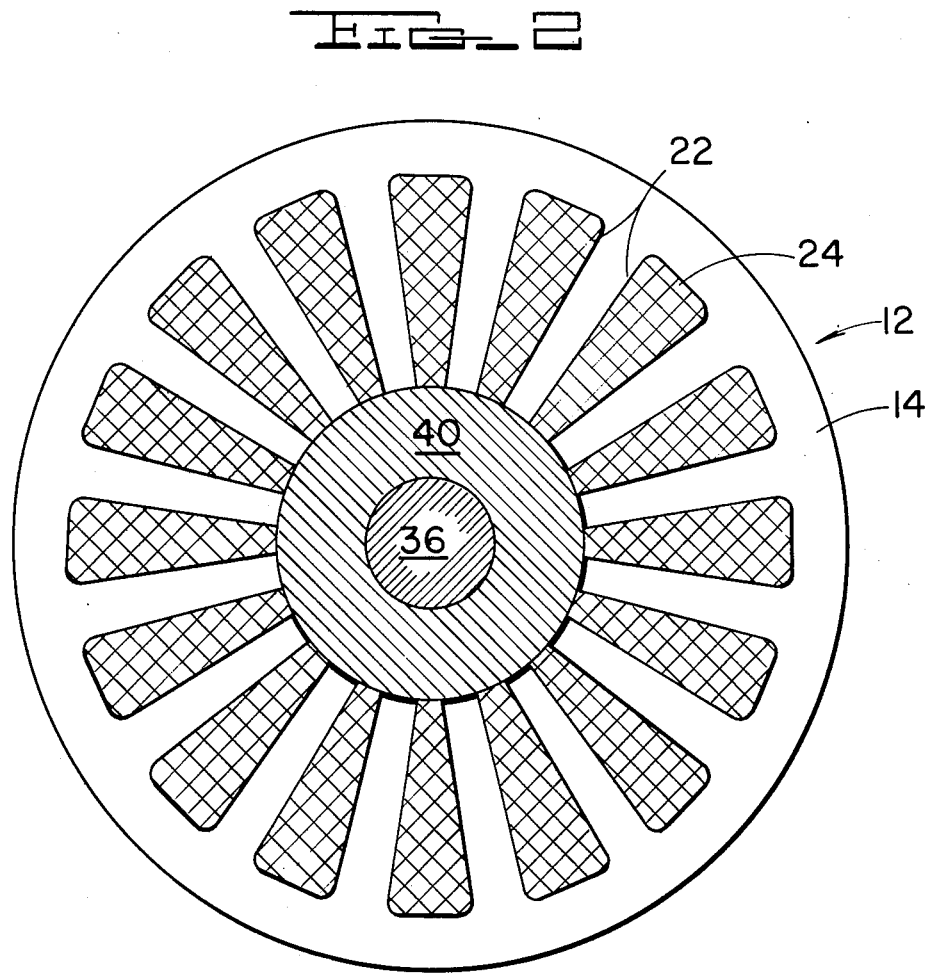

BEARING ASSEMBLY FOR DYNAMOELECTRIC MACHINE

BACKGROUND OF THE INVENTION

1. Field of the Invention

This invention relates generally to dynamoelectric machines, and more particularly to bearing assemblies for rotatably mounting the rotor member of the machine.

2. DESCRIPTION OF THE PRIOR ART

Conventional dynamoelectric machines comprise a stator core member formed of a stacked plurality of relatively thin laminations of magnetic material and having opposite end faces with a bore extending axially between the end faces and winding slots extending radially outwardly from the bore and axially between the end faces, a rotor member mounted on a shaft and positioned in the bore, and a housing or frame including at least a pair of end shield members positioned at opposite ends of the stator core member and respectively having bearings mounted therein for rotatably supporting the shaft.

SUMMARY OF THE INVENTION

It is desirable in the case of certain dynamoelectric machines where size, weight and cost factors are important considerations, such as in miniature motors and synchros, to eliminate as many elements as possible. In accordance with the present invention, in its broader aspects, the end shields previously employed in connection with dynamoelectric machines are eliminated completely and the bearings for rotatably supporting the shaft and rotor member are directly mounted in the bore of the stator core member.

It is accordingly an object of the invention to provide an improved bearing assembly for dynamoelectric machines.

Another object of the invention is to provide an improved bearing assembly for dynamoelectric machines which eliminates the end shield members previously employed.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side, cross-sectional view showing a dynamoelectric machine incorporating the improved bearing assembly of the invention; and, FIG. 2 is a cross-sectional view taken along the line 2—2 of FIG. 1.

DESCRIPTION OF THE PREFERRED EMBODIMENT

Referring now to the figures of the drawing, there is shown a dynamoelectric machine, generally indicated at 10, which comprises a stator core member 12 formed of a stacked plurality of relatively thin laminations 14 of magnetic material and having opposite end faces 16, 18 with cylindrical bore 20 extending therebetween. Stator core member 12 has a plurality of winding slots 22 formed therein extending radially outwardly from bore 20 and axially between end faces 16, 18, winding slots 22 accommodating field windings 24.

Rotor member 26 is provided mounted on shaft 28 and having opposite ends 30, 32, rotor member 26 being rotatably mounted in bore 20 of stator core member 12 and defining a radial air gap therewith. Rotor member 26 is axially shorter than stator core member 12 and shaft 28 has extensions 34, 36 extending axially outwardly from ends 30, 32.

In order rotatably to support shaft 28 and rotor member 26, bearings 38, 40 which respectively journal shaft extensions 34, 36 are press-fitted into bore 20 of stator member 12; bearings 38, 40 may have flange portions 42, 44 which respectively engage end faces 16, 18. Snap ring 46 seated in a groove (not shown) in shaft 34 locates rotor member 26 and with shims 48, 50 controls end play of shaft 34 and rotor 26.

In a specific embodiment of the invention incorporated in a stepper motor, rotor 26 is a cylindrical permanent magnet having a diameter of 0.4900 inch and an axial length of 1.050 inch. Stator member 12 has an outside diameter of 1.361 inch and an axial length of 1.296 inch, and bore 20 has an inside diameter of 0.5000 inch. Bearings 38, 40 are sleeve bearings formed of lubricant-impregnated sintered bronze.

While a permanent magnet rotor member 26 and sleeve bearings 38, 40 have been shown, it will be readily understood that the invention is equally applicable to constructions incorporating other types of rotor members and other types of bearings, such as ball bearings.

While there have been described above the principles of this invention in connection with specific apparatus, it is to be clearly understood that this description is made only by way of example and not as a limitation to the scope of the invention.

What is claimed is:

1. In a dynamoelectric machine having a stator core member formed of magnetic material and having opposite end faces with a bore extending axially therebetween, said stator core member having radially inwardly extending teeth defining winding slots therebetween extending radially outwardly from said bore and axially between said end faces, said teeth having inner ends defining said bore a rotor member in said bore, said rotor member being mounted on a shaft and having opposite ends, and bearing means on said shaft respectively adjacent said opposite ends of said rotor member for rotatably supporting the same, the improvement wherein said bearing means are nonmagnetic and are respectively mounted in said bore engaging said inner ends of said teeth.

2. The machine of claim 1 wherein said bearing means are press-fitted in said bore.

3. The machine of claim 1 wherein said bearing means have flange means thereon for respectively engaging said stator core member end faces.

4. The machine of claim 1 wherein said bearing means are sleeve bearings respectively having outer surfaces engaging said bore adjacent said end faces.

5. The machine of claim 4 wherein each of said bearings has a flange thereon engaging the respective stator core member end face.

6. The machine of claim 5 wherein each of said bearings is formed of lubricant-impregnated sintered metal.

* * * * *